July 16, 1929.　　　C. E. F. AHLM　　　1,720,988
TRANSMISSION GEARING
Filed June 5, 1925　　　4 Sheets-Sheet 1

Inventor
Charles E. F. Ahlm
By Bates, Macklin,
Tobrick & Teare　Attorneys

July 16, 1929.  C. E. F. AHLM  1,720,988
TRANSMISSION GEARING
Filed June 5, 1925　　4 Sheets-Sheet 2

Inventor
Charles E. F. Ahlm
By Bates, Macklin,
Golrick & Teare Attorneys

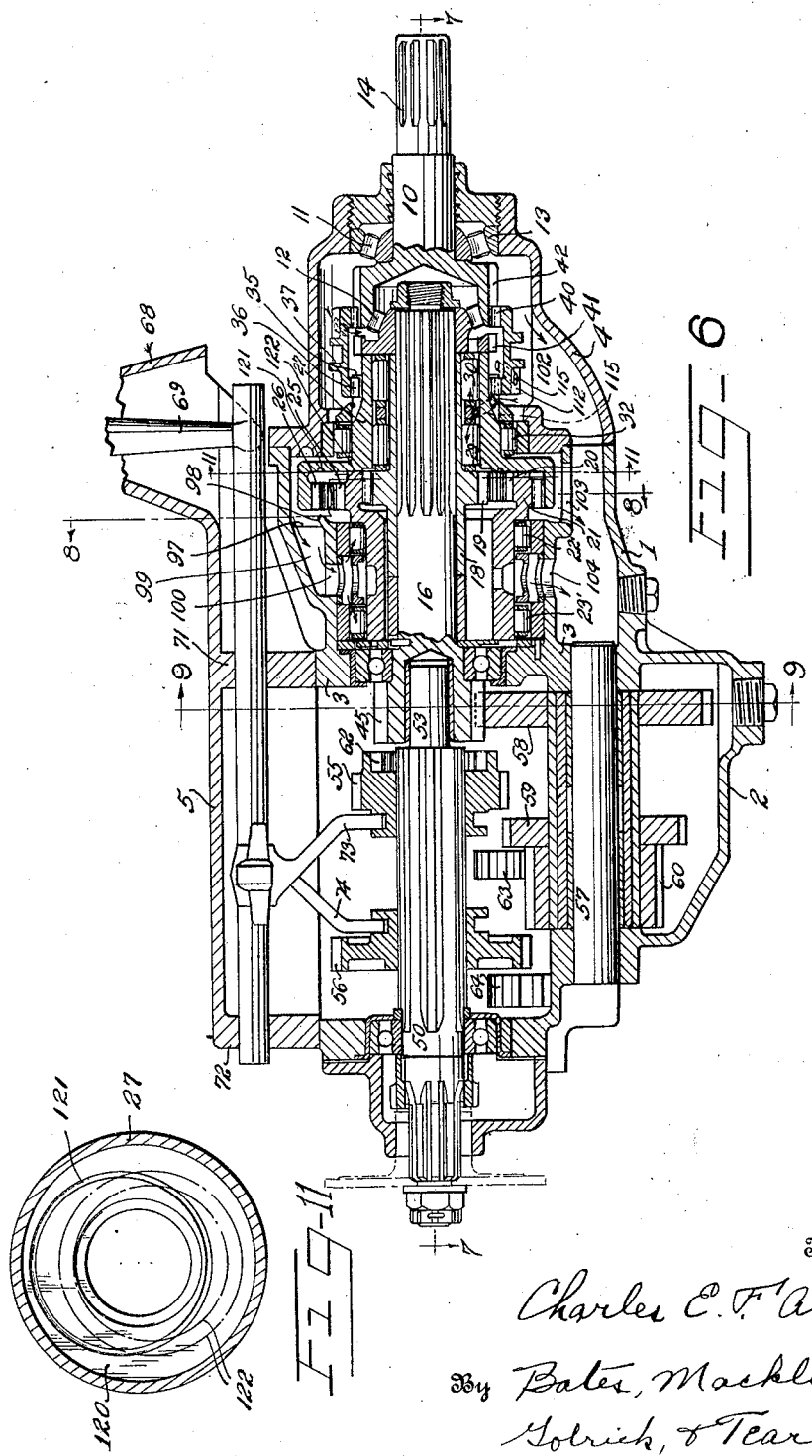

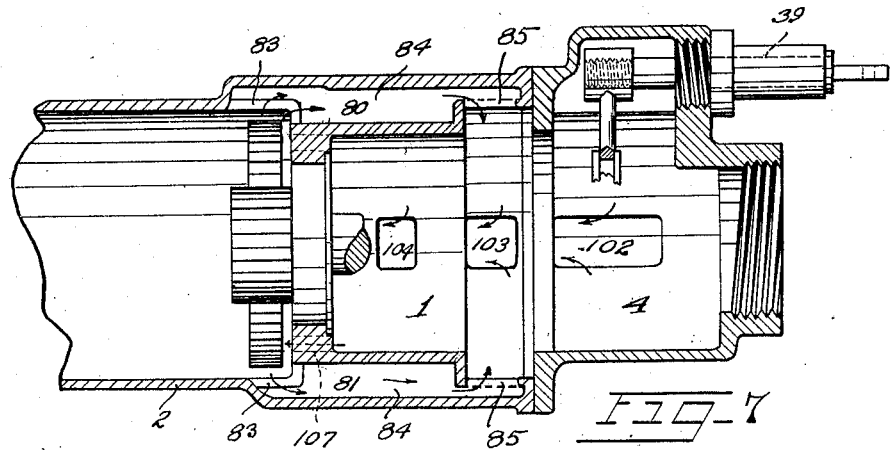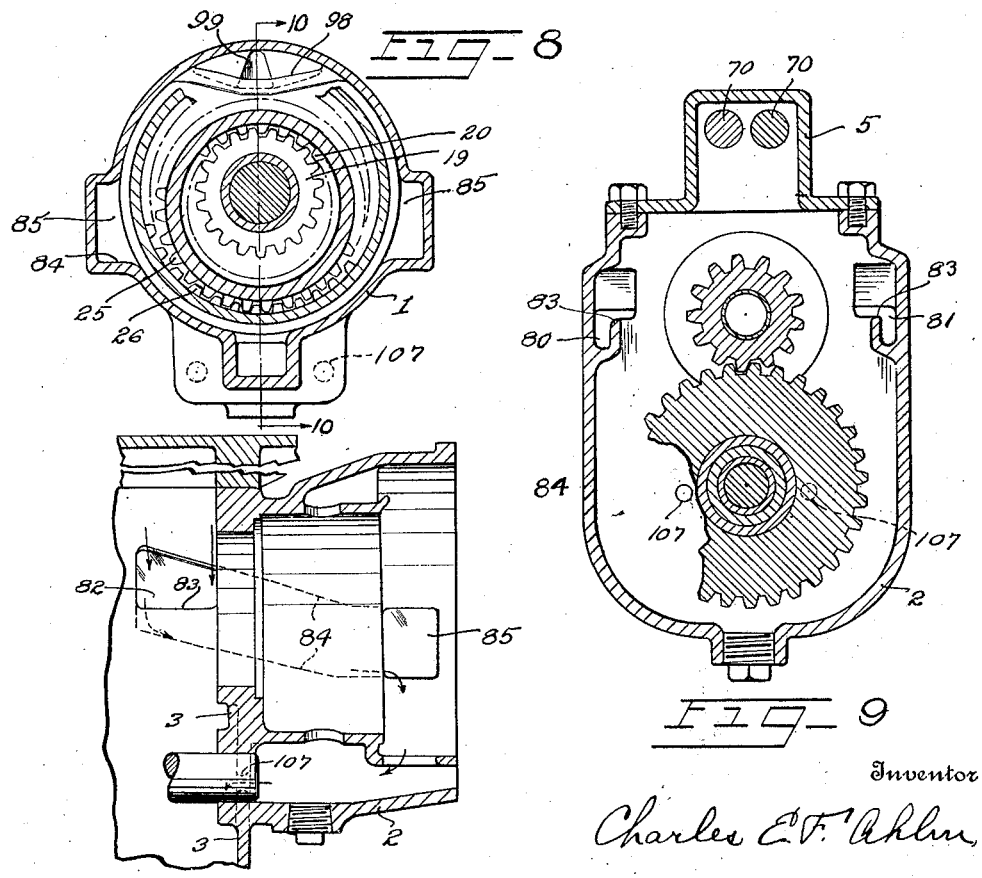

Patented July 16, 1929.

1,720,988

UNITED STATES PATENT OFFICE.

CHARLES E. F. AHLM, OF CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed June 5, 1925. Serial No. 35,050.

This invention relates to automobile transmission gearing and the general object is to provide an extremely efficient transmission including a reduction or increased speed unit, the entire gearing being mounted in the same general casing and all parts of which shall be so arranged as to secure complete lubrication.

The invention combines a standard selective transmission unit with a single speed increasing or reduction gearing to which I will hereinafter refer as an auxiliary gearing and a feature is that oil for all the gears and bearings including those of the auxiliary gearing may be replenished by putting oil into only one gear casing.

A primary characteristic of the invention is that the auxiliary gearing is disposed forwardly of the standard transmission and is adapted to receive power directly from the engine shaft with the result that the gears of the auxiliary unit are never subjected to greater stress than that delivered by the engine alone. This arrangement is contrary to the general practice of positioning the reduction or increased speed gearing between the standard transmission gearing and the rear axle propeller shaft, which practice subjects the gears and shaft of the auxiliary unit to undue strain whenever the standard transmission is operating in intermediate or low speed.

The use of internal-external gears eccentrically mounted relative to aligned driving and driven shafts necessitates placing bearings for the shaft and gears in inaccessible positions, and a purpose of my invention is directed to lubricating such bearings and includes the provision of oil scooping channels in the rotating members which are adapted to dip into oil contained in the casing and by reason of the rotation of the members force it inwardly toward the bearings.

The mechanism and its operation will be hereinafter more fully explained in connection with the accompanying drawings which illustrate the preferred forms of my invention. The essential novel characteristics will be summarized in the claims.

Figure 1:
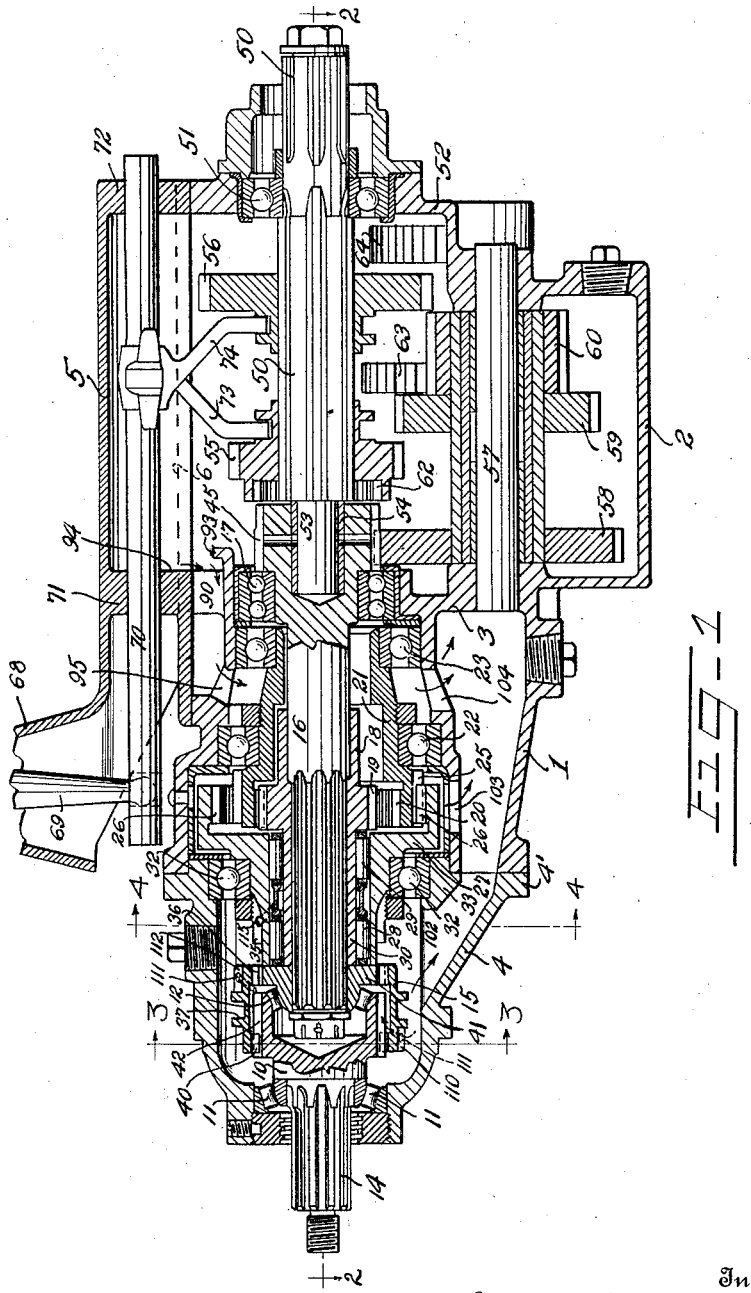
Figure 2:
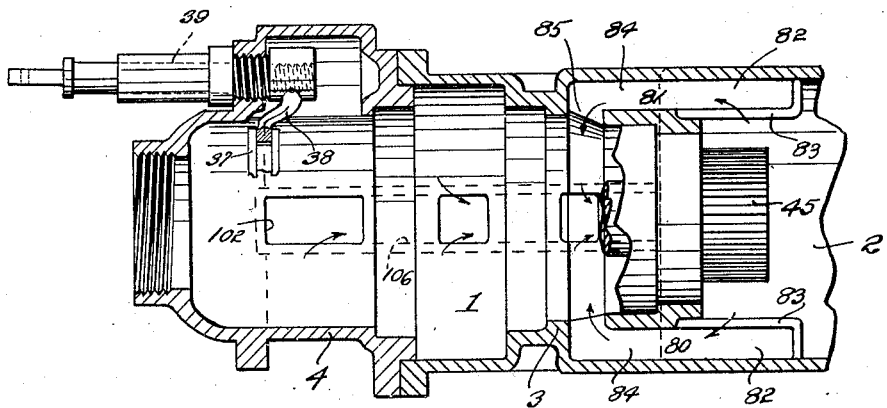
Figure 3:
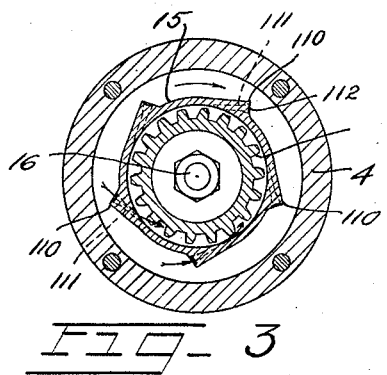
Figure 4:
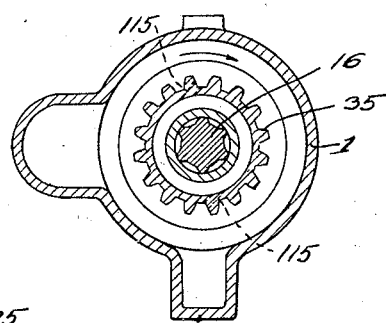
Figure 5:
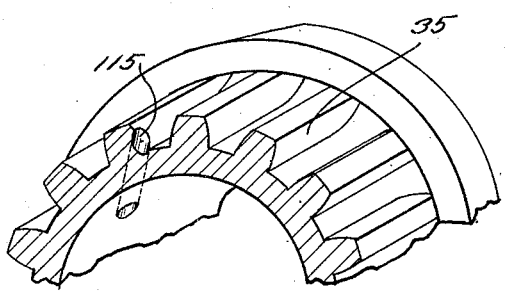

In the drawings, Fig. 1 is a substantially central longitudinal section through my gearing; Fig. 2 is a fragmentary sectional plan of the interior of a portion of the casing showing various oil channels; Fig. 3 is a transverse section as indicated by the line 3—3 on Fig. 1; Fig. 4 is a transverse section as indicated by the line 4—4 on Fig. 1; Fig. 5 is a fragmentary sectional perspective view of a gear provided with an oil channel in the region of the teeth; Fig. 6 is a substantially central longitudinal section of a modification of the gearing similar to that shown in Fig. 1; Fig. 7 is a fragmentary sectional plan of the modified form similar to Fig. 2; Fig. 8 is a transverse section as indicated by the line 8—8 of Fig. 6; Fig. 9 is a transverse section as indicated by the line 9—9 on Fig. 6; Fig. 10 is a fragmentary longitudinal sectional view of the interior of the casing taken along a vertical plane as indicated by the line 10—10 on Fig. 8; Fig. 11 is a fragmentary cross section as indicated by the line 11—11 on Fig. 6.

Referring first to the embodiment illustrated in Fig. 1 and designating the various parts by numerals, 1 indicates the forward portion of the casing adapted to contain the auxiliary gearing and 2 indicates generally the rearward portion adapted to house the gearing and shafts of the standard transmission portion of my mechanism, the two parts of the casing being separated by a bearing supporting and partition wall 3. The forward end 4 of the portion 1 of the casing, is preferably a separate section shown as flanged as at 4' and bolted or otherwise secured to the main portion of the casing. The casing is shown as open at the top and a cap member 5 supporting shifting mechanism to be later described, may cover the opening arranged to be secured to the main casing along a flange 6 in the usual manner.

The main driving shaft is indicated at 10 and is shown as supported by bearings 11 and 12, the former being shown as carried directly by the section 4 of the casing. The shaft is shown as splined at its free end at 14 to provide for driving engagement with the usual universal coupling or joint (not shown) extending from the engine shaft.

The driving member 10 connects either with an intermediate shaft 16 which is shown as adapted to directly drive the gears of the standard transmission to be presently described or with a gear 27, and to this end may be provided with a dental clutch arrangement which as shown includes a longitudinally shiftable dental member 15, shown in position to connect the member 10 with the intermediate shaft. The shaft has at its right hand end, as shown in Fig. 1, a bearing 17 in the partition member 3 of the casing. Rigidly secured to shaft 16 I have shown a tubular member 18 provided exteriorly with gear teeth 19, adapted to mesh with gear teeth 20 carried on an eccentrically mounted gear member 21. The eccentric mounting for the gear may comprise spaced roller bearings 22 and 23 suitably supported by the casing with their axes offset from that of the shaft 16. The gear member 21 may be provided with external teeth 25 shown as in mesh with internal teeth 26 of the gear member 27. This latter gear is shown as supported by a roller bearing 32 having its outer race carried by an annular member 33, preferably formed as a part of the forward portion 4 of the casing. Spaced roller bearings 28 and 29 are shown as interposed between the gear member 27 and a forward extension 30 of the member 18. This gear member is provided near its forward end with clutch teeth 35 adapted to mesh with complementary clutch teeth 36 on the member 15, which member is provided with the usual shifter rings 37, shown as engaged by an arm 38 carried by a shifting bar 39 as shown in Fig. 2.

The teeth 40 of the clutch member 15 are in constant-engagement with teeth 42 of the member 10, hence the member 10 may be caused to drive the shaft 16 directly, through the dental clutch member 41, with the clutch member 15 in the position shown in Fig. 1, or it may drive the internal gear member 27 when the member 15 is shifted forwardly to cause engagement between the clutch teeth 35 and 36. In this latter position the gear teeth 26 rotate the gear member 21 at a relatively higher speed in the same direction which in turn drives the shaft 16 at a still higher speed through the gears 20 and 19. By the arrangement just described the gears of the auxiliary gearing are rotated in the same direction under the constant load delivered by the engine shaft wherefore nearly all the parts may be made using less material than if the auxiliary gearing had to take additional load from the standard transmission when operating in low speeds or reverse. The single direction of rotation is taken advantage of by my bearing lubricating means to be later described.

Within the portion 2 of the casing I have shown a shaft 50 in alignment with the shaft 16, which may be suitably supported at one end by a roller bearing 51 in the end wall 52 of the casing, and at its other end by a reduced portion 53, extending into a bearing 54 interiorly of the shaft 16. This shaft carries the usual shiftable gear members 55 and 56. Below the shaft 50 I have shown a jack shaft 57 supported in the usual manner and carrying relatively rigid gears 58, 59 and 60, the first of which is in constant mesh with the gear 45. The gear 55 has the usual internal teeth 62 capable of meshing with the teeth of the gear 45 for effecting direct drive between the shafts 16 and 50. The external teeth of the gear 55 may also be thrown in mesh with the gear 59 for driving the shaft 50 at a reduced speed, or the gear 56 may be thrown into mesh with the gear 60 for low speed. Reverse is accomplished by the usual jack shaft (not shown) carrying gears 63 and 64, the former of which is constantly driven from the gear 60, the latter being capable of being engaged by the gear 56.

In order to provide for operating the gears of the standard transmission from a position which corresponds to that occupied by the gear shift lever in the present cars, I provide an extension 68 on the cap member 5 which may be adapted in a manner not shown to provide the usual pivotal support for a shifter lever 69. The lower end of this lever may engage selectively a pair of shifting rods, one of which is shown at 70 as extending forwardly of a bearing portion 71 in the cap. The bars may extend, as shown, into a bearing portion 72 at the rear end of the cap and may be provided with the usual shifter fingers 73 and 74 adapted to engage the usual collars on the gears 55 and 56 respectively.

The general arrangement of parts is substantially the same in the embodiment shown in Fig. 6 as in that just described, and the same reference characters are used to designate similar parts. The longitudinal section through this embodiment is taken in the opposite direction from that of Fig. 1, hence the position of the standard gearing and auxiliary gearing is reversed in the drawing. The shaft 10 as before is intended to be connected directly to the engine shaft. The bearing arrangement in this modification is somewhat different in that the bearings which correspond to bearings 22 and 23, are, in this case, rollers 22' and 23' which bear directly on the gear member 21, and the same is true of the bearings which correspond to the bearing 32 in Fig. 1 and which are, in this case, rollers, shown as bearing directly on the cylindrical outer surface of the gear member 27. This arrangement requires less material and is more compact and simple than that shown in Fig. 1.

The oiling arrangement whereby oil is distributed to the auxiliary gearing from the main oil supply comprises in general suitable channels and guideways for oil leading from the standard transmission portion of the casing to the various parts of the single speed change gearing, with the result that oil maintained at a given level in the standard transmission compartment will be adequately distributed to the auxiliary gearing, regardless of the tendency for one portion of the gearing to draw and isolate the bulk of the oil in one region of the casing. The rotation of the gears in the compartment 2 will throw oil in appreciable quantities against the side walls and cap 5 which will normally run back down the side walls into the well or bottom portion of a casing. The means shown for carrying a portion of this oil forwardly into the auxiliary transmisison is essentially the same in both embodiments. The arrows indicate the direction of flow of oil.

Referring particularly to Figs. 2 and 7 to 10, I have shown oil channels 80 and 81 disposed at either side of the portion 2 of the casing and leading to within the portion 1. These channels consist of cup portions 82 extending along the wall of the casing each preferably having a brim 83 within the casing portion 2, the cup merging into closed passages 84. The floors of the passages slope forwardly as shown in Fig. 10 and the passages terminate in the openings 85 leading to the general region of the internal-external gears. As shown particularly in Fig. 2, the openings communicate with the region intermediate the bearings for the gear member 21 while in Fig. 7, the openings are in the zone of the internal-external gears. In the former case, the bearing construction admits considerable oil to the gears through the bearings, and in the latter the gears serve to carry oil to the bearings through a channel to be presently described.

As shown in Fig. 1, I utilize the oil drip from the forward inner wall of the transmission cap, to provide overhead lubrication for the auxiliary gearing, and to this end, provide a channel 90 as shown in Fig. 1 which communicates with an opening 95 between the bearings 22 and 23. A cup 93 having its brim extending slightly within the housing portion 2 is arranged to trap oil carried along the roof of the cap and running down the vertical surface 94. The oil caught by this brim will be directed along the channel 90 into the opening 95.

In Figs. 6 and 8, I show a similar arrangement to that just described for carrying oil thrown by the auxiliary gearing against the roof and forward wall surface 97. The arrangement includes a brim 98 communicating with a channel 99 leading to an opening 100 in the region of the bearing rollers 22' and 23'.

To provide free communication of oil from the auxiliary transmission portion of the casing back into the rearward compartment, so that the auxiliary gearing will not isolate more oil than it requires, I provide openings 102, 103, and 104 along the floor of the auxiliary gear casing, which communicate with a channel 106. This channel slopes rearwardly and carries the oil in the direction of the arrows against the wall or partition 3 where it may be admitted through suitable openings such as shown at 107 in Figs. 7, 9, and 10 into the housing for the standard gearing.

Under ordinary running conditions, the oil will be kept at a high enough level to maintain a well of oil into which all the gears will dip and thus be lubricated. But if the oil supply is lowered, say to a point below the lowermost gear teeth 26 of the gear 27, there will still be an adequate supply of oil, fed forwardly through the various channels to prevent damage resulting from dry gears and the gears will distribute oil to their respective bearings. At the same time, the generous sized passageways will lead the surplus oil back into the rearward compartment so that no oil will be kept idle.

In Figs. 1, 3, 4, 5 and 8, I have illustrated various forms of oil scooping arrangements whereby inaccessible parts such as bearings may be adequately lubricated by the rotation of the various members. In Fig. 1, the bearings 12, 28, and 29 are exceedingly difficult to lubricate and when attempting to lubricate them by generally accepted methods I have found that after running for some time, the bearings show evidence of having been excessively heated. To overcome this difficulty with respect to the bearings 12 for example, I have provided the clutch member 15 with boss members 110 having openings 111 which extends from forwardly facing abrupt surfaces 112 into the interior of the clutch member. The openings are shown as extending at an angle to a vertical transverse plane to direct the flow of oil into the space shown between the members on which the clutch teeth 36 and 42 are mounted to better distribute oil to the bearings 12. By this arrangement when the clutch member is being rotated in contact with a well of oil, the openings act successively as scoops by reason of the relative velocity between the oil and clutch member to project streams of oil toward the bearing. The bosses 110 are preferably arranged at either side of the clutch rings so that when the clutch member 16 is in either of its positions, there will always be a series of openings active.

The same general principle is shown as applied to the gear member 27 that is shown as carrying openings 115 which terminate exteriorly of the gear member on the forward surface of the teeth, that is to say the surface which first dips into the oil. Here again the openings may be inclined to a vertical transverse plane as shown so that an even distribution of oil may be had for both the roller bearings 28 and 29.

In the embodiment shown in Fig. 6 wherein I use roller bearings in place of balls, I show the forward annular surface of the gear 21 as abutting the substantially flat rear surface 120 of the gear 27 to take up the thrust. I preferably employ an eccentric groove 121 as shown in Fig. 11 across which the annular front surface of the gear 21 indicated by broken lines at 122 will wipe and convey oil to both surfaces as well as to the gears 21 and 27 to the teeth 19 and 20 and to the rearward end of the bearing 29. It will be noted that a portion of the groove will be at all times outside of the annular surface and a portion inside by reason of the eccentric movement of the gear 21 wherefore both outlet and inlet may be constantly afforded to the groove.

A novel feature of my invention is the bearing arrangement for the primary driving member 10 wherein the rollers composing the bearing 12 are concave and provided with complementarily curved races. This arrangement relieves the strain on the bearings in case true alignment is not secured between this member 10 and the engine shaft. Thus if the members 10 were to be somewhat out of alignment relative to the shaft 16, the concave rollers on one side of the shaft would tend to back up slightly while those on the other side would shift slightly forward with the result that the bearings would be subjected to equal compression on either side of the shaft. Substantially the same thing occurs with respect to the bearing 12 which is composed of similar concave rollers and globular or convex races.

It will be seen that I have provided a very complete gearing capable of carrying out the objects previously outlined. The various features are capable of being embodied in modifications not herein illustrated and I do not therefore wish to limit myself in carrying out my invention to inessential details.

I claim:

1. In combination in a gearing, a driven member, a pinion carried thereby, an internal-external gear member having teeth in mesh with said pinion and an internal gear adapted to drive said internal-external gear bearings for said shaft within said internal gear and means including non-radial channels carried by the internal gear and terminating at one end in the region of the bearings for scooping oil when the gears are rotated and directing it to said bearings.

2. An oiling system for gearing comprising a two-part casing, one part having its floor portion lower than the other to provide a well for oil, a separate gear unit in each part of the casing, the units being interconnected, certain of the gears of one unit running in the oil to splash the oil onto adjacent casing walls, and an inclined channel leading from the side wall of the casing portion having the well and inclining downwardly toward the other portion of the casing, there being an outwardly and upwardly extending lip member joined to the casing wall at each end and forming a cup at the higher end of the channel arranged to trap oil and guide it into the channel, and there being a discharge opening at the lower end of the channel for carrying oil conveyed by the channel to the other gear unit, and means for draining oil from the casing portion containing such other unit back into the well containing portion.

3. An oiling system for gearing, comprising a casing having a transverse partition dividing the casing into two compartments, change speed gear units located in each compartment, a shaft extending through the partition and connecting the two units, an oil channel formed in the side wall of the housing and leading past the partition from one compartment to the other, the receiving end of the channel comprising an outwardly and upwardly extending lip joined at its ends to the casing wall and separated therefrom at its top edge for catching oil splashed by the gears in the compartment at such receiving end as the oil runs down the side wall of this compartment, and means for draining the oil from the other compartment back to the supply.

In testimony whereof, I hereunto affix my signature.

CHARLES E. F. AHLM.